Dec. 8, 1964 E. L. DIX 3,160,822

QUARTZ CRYSTAL DISCRIMINATING CIRCUIT

Filed Oct. 31, 1960

INVENTOR
EDGAR L. DIX

BY John E. Kidd AGENT

[signature] ATTORNEY

United States Patent Office 3,160,822

Patented Dec. 8, 1964

3,160,822

QUARTZ CRYSTAL DISCRIMINATING CIRCUIT

Edgar L. Dix, Oxon Hill, Md., assignor to the United States of America as represented by the Secretary of the Navy Filed Oct. 31, 1960, Ser. No. 66,364

5 Claims. (Cl. 329—117)

(Granted under Title 35, U.S. Code (1952), sec. 266)

The invention described herein may be manufactured and used by or for the Government of the United States of America for governmental purposes without the payment of any royalties thereon or therefor.

This invention relates to detection or demodulation of frequency or phase modulated waves in high frequency signals and more particularly to a quartz crystal frequency discriminator having extremely high sensitivity and stable narrow band response.

In the field of communications, the wide use of frequency and phase modulated signals make a low cost and simplified frequency discriminator particularly desirable. In certain applications, it is necessary that the center frequency at which the discriminator circuit operates be maintained within very close tolerance limits. This is especially true for narrow band communications over long distances in space where it is desirable to provide as narrow a separation in the band signal as is permitted by the intelligence to be transmitted.

In the past the frequency discriminator networks have commonly required bulky and not readily adjustable filters or comparatively expensive tubes and transistors to provide a usable audio signal. Conventional circuits have the added disadvantage of low sensitivity, difficulty in maintaining linearity and a broad frequency slope due to a moderate or inadequate Q value. Transistorized circuits are impaired because of the non-linear feedback capacitances that may exist when the collector current is driven to saturation, leading to unstable operation and distortion of its response characteristics. Furthermore, in the past, difficulty has generally been experienced in effecting substantial reduction in circuit complexity and cost while at the same time retaining sufficient sensitivity and stable operation. In circuits employing crystals, the use of such circuits has been seriously limited by the reactance vs. frequency characteristics and required extremely high primary and secondary circuit Q.

The general purpose of this invention is to provide a discriminator network for detecting an output signal wherein the frequency sensitivity is improved in the order of 10 to 20 times over conventional methods of extracting information from a carrier, while at the same time maintaining tuning stability. Both of these features make possible the observation and measurement of very small deviations in frequency modulation signals on the order of 1 cycle in 100 mc. of one part in $10^8$ which was heretofore unattainable.

It is an object of this invention, therefore, to provide a detection and demodulation network of extremely high sensitivity and narrowband response.

It is a further object to provide a narrow band frequency discriminator circuit for use in a ground receiver and as a stable oscillator feedback frequency control circuit for transmitters such as employed in space communications.

Still another object is to provide a highly sensitive detection circuit which employs a quartz crystal as a frequency discriminating element which has a narrower and more stable bandwidth than has been generally associated with crystal discriminators heretofore.

A still further object is to provide a crystal frequency discriminator circuit wherein the resonant responses are very close together in the frequency spectrum while still providing a high effective Q.

Other objects and features of this invention will become apparent to those skilled in the art as the disclosure is made in the following detailed description of a preferred embodiment of the invention as illustrated in the accompanying sheet of drawing in which.

Figure 1:
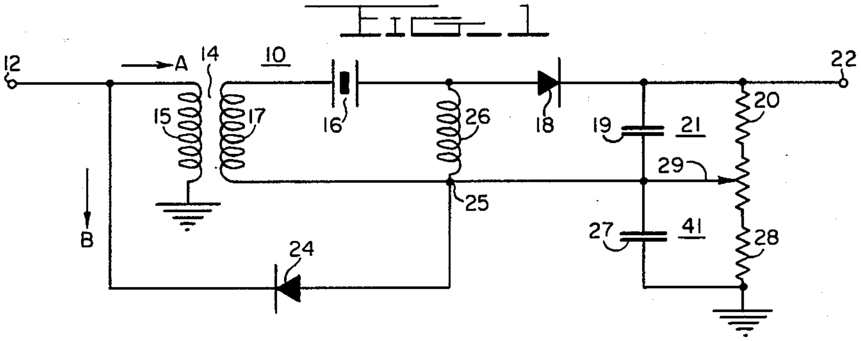
FIG. 1 shows a schematic circuit diagram of the basic circuit of an improved narrow band frequency discriminator circuit in accordance with the principles of my invention.

Referring now to the drawings, and in particular to FIG. 1, a frequency modulation detector circuit incorporating a quartz crystal frequency discriminator is shown. The quartz crystal used herein exhibits the characteristics of both a series and a parallel resonant circuit where the spacing of the resonant responses are very close together and in addition the effective Q of both resonant circuits is extremely high. By the proper utilization of these charactertistics in the associated circuitry shown, a frequency versus amplitude response is obtained which closely parallels the action of a conventional discriminator circuit whereby an extremely sensitive detector for frequency modulated signals is made possible. Sensitivity at 100 mc. is about 4000 c.p.s. per volt output and by suitable amplification, deviations of the order of one cycle at 100 mc. have been observed.

At input terminal 12, a frequency modulated RF signal is introduced in the discriminator network 10 and is fed through channel A to a piezoelectric element 16 by means of an isolation transformer 14. Isolation transformer 14 has primary winding 15 and secondary winding 17, with winding 15 connected to ground. In this invention the piezoelectric element is a quartz crystal having a series resonant frequency $f_1$ and a parallel resonant frequency $f_2$ and a center frequency, or crossover, $f_c$, as illustrated graphically in FIG. 2. At the series resonant frequency $f_1$ of the crystal, the impedance is very low (50 to 100 ohms) and resistive. Under these conditions, the signal is passed through the crystal with minimum attenuation, resulting in a detected output signal that is at maximum voltage. At a slightly higher frequency $f_2$, the crystal is at parallel resonant frequency and the impedance is very high (approximately 1 megohm or more) and resistive. Under these conditions, the signal is greatly attenuated in passing through the crystal, resulting in a minimum detected output. The frequency slope between $f_1$ and $f_2$ can be varied or changed by the addition of external reactive components either in series or in shunt with the crystal. For example, a series inductance will lower $f_1$ but will have little effect on $f_2$. A series capacitor will have the reverse effect. A shunt inductance across the crystal will raise $f_2$ and have little effect on $f_1$. Again a capacitor has the opposite effect.

The output of quartz crystal 16 is serially connected to diode 18 and RC filter 21, composed of capacitor 19 and resistor 20. This rectifier filter combination provides a D.C. voltage at the output 22 that is proportional to the amplitude of the R.F. input signal. The RC value for filter 21 should be about 10 times the period of the R.F. cycle for optimum response. Choke 26 is of the R.F. type and provides a D.C. return for the rectified current since crystal 16 acts as a blocking capacitor. It should be appreciated that if a greater degree of isolation is required, then a choke coil could be added to the filter circuitry.

Figure 2:
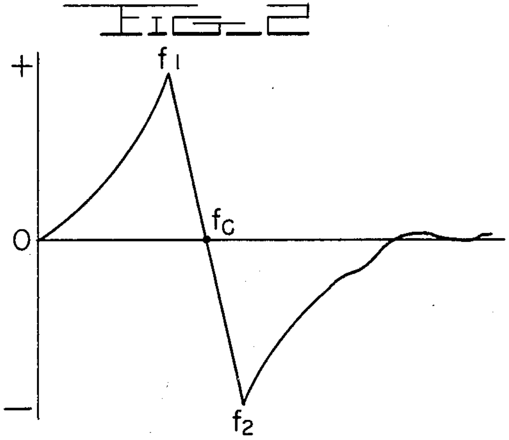
FIG. 2 is a graphic illustration of the frequency characteristics of the circuit shown in FIG. 1.

A voltage is developed in channel A which has frequency-voltage characteristics similar to the shape of the curve shown in FIG. 2. However, because of the diode 18, the voltage curve of channel A is completely positive. As subsequently explained, the output signal at 22, which is illustrated in FIG. 2, is obtained by adding the all-positive signal developed in channel A with a negative voltage developed in channel B.

The input signal introduced at 12 is also applied to channel B which includes diode 24 and RC filter 41 composed of capacitor 27 and resistor 28. Channel B developes a negative voltage which is independent of frequency but is proportional to the generally constant amplitude level of the input signal. Changes in the amplitude level of the input signal are largely compensated for, particularly in the frequency range $f_1$ to $f_2$, because channels A and B respond to such amplitude changes by developing voltages of opposite polarities. The combined signal from channels A and B, which is the output signal at 22, will, as illustrated in FIG. 2, be positive at $f_1$ of crystal 16 and negative at $f_2$ of crystal 16, as is encountered in conventional discriminator circuits, but with a much narrower bandpass, thus sharpening the response to the desired frequencies and substantially reducing or eliminating noise signals outside of the bandpass of the crystal. The isolation transformer 14 is necessary to accomplish the addition of these two voltages (in channels A and B) and also to provide a means of adjusting the input impedance and level of the signal source feeding the crystal 16. By making connection 29 the arm of a potentiometer connected between resistors 20 and 28, the amount of negative signal added at connections 25 and 29 to the modulated signal from crystal 16, may be adjusted and thus the center frequency $f_c$ can be changed so as to move up or down the ordinate axis of the graph shown in FIGURE 2. This circuit has been incorporated and found practical in systems where the RF signal applied to terminal 12 was in the 100 mc. range.

Referring to FIG. 2, a graphic illustration of the output voltage versus frequency is illustrated. The positive peak of the output voltage is represented by $f_1$, the negative peak by $f_2$ and the center frequency by $f_c$. The frequency interval between the points of zero output voltage is designated as the bandwidth of the discriminator.

Figure 3:
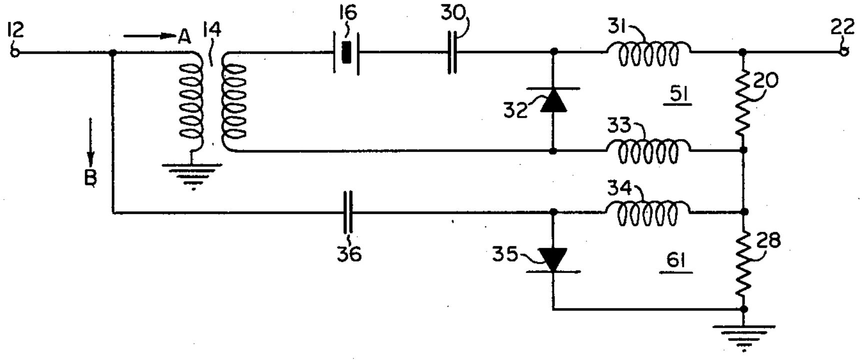
FIG. 3 shows another circuit embodiment having the same characteristics as the circuit shown in FIG. 1.

The network shown in FIG. 3 is another circuit having the same characteristics as the circuit shown in FIG. 1. Here the RF signal is introduced at terminal 12 and is divided into channel A and channel B as in FIGURE 1. In channel A, crystal 16 again produces a positive frequency characteristic similar to that shown in FIGURE 2, only here a different type of filter arrangement 51 is provided. Instead of a capacitor shunting the crystal as in filter 21, filter 51 provides a capacitor 30 and RF coil 31 in series with diode 32 in shunt. The RF input signal is also passed through channel B by means of capacitor 36 and filter 61 composed of diode 35, coil 34 and resistance 28, thereby bypassing transformer 14 and frequency modulating crystal 16 and providing the D.C. voltage signal which is to be algebraically added to the signal of channel A. As in FIG. 1 a self adjustable balancing voltage is added to the frequency modulating voltage of channel A, providing an extremely narrow bandwidth discriminating circuit. To provide for means to adjust the center frequency $f_c$ or crossover, it is contemplated that coils 33 and 34 may be joined together and made to form a potentiometer arm, such as arm 29 in FIGURE 1, connected between impedances 20 and 28, respectively. By providing the circuits with a potentiometer such as 29, the need for a limiter is generally alleviated.

It will now be apparent that I have provided a simple and effective frequency discriminator circuit wherein an extremely sensitive detector for frequency modulated signals is made possible.

A unique feature of this invention resides in the high frequency range with which crystal 16 is capable of operating in. Prior to this invention no crystal circuits were available for satisfactory operation in the 100 mc. range. In this invention, a crystal fabricated to enhance the 5th overtone domain of the crystal, is incorporated with minimum circuitry to provide a high degree of frequency stability. For optimum operation, the circuit should be operated between a low source impedance and a comparatively moderately high load impedance.

Various modifications are contemplated and may obviously be resorted to by those skilled in the art without departing from the spirit and scope of the invention as hereinafter defined by the appended claims.

What is claimed is:

1. In a narrow bandwidth frequency discriminator circuit comprising an RF input signal source, first means for frequency monitoring the RF signal and for converting the RF signal to a D.C. voltage proportional to the RF amplitude including a quartz crystal which exhibits both series and parallel resonant circuit characteristics, an isolating transformer for coupling said first means to said RF input signal source, second means connected to said RF input signal source and bypassing said isolation transformer for providing another signal whose D.C. voltage is substantially independent of the frequency of the input signal but is proportional to the level of the input signal, means for adding algebraically the D.C. bypass voltage of said second means to the frequency monitored D.C. voltage of said first means whereby said D.C. bypass voltage provides a self-adjustable balancing voltage for said circuit, and output means connected to said adding means.

2. In a frequency discriminator circuit as set forth in claim 1 wherein the first means includes said quartz crystal and a diode connected in series and an RC filter shunting said diode, and said second means comprises a diode connected reversely of said other diode and an RC filter in shunt.

3. In a frequency discriminator circuit as set forth in claim 2 wherein means are provided for adjusting the amount of signal bypassing the crystal that is added, thereby providing a means for changing the zero point of the output characteristic of said circuit.

4. In a narrow bandwidth frequency discriminator comprising an RF input signal source, a quartz crystal frequency modulating element having low impedance at series resonant frequency whereby the signal is passed through the crystal with minimum attenuation and the detected output is maximum and a high impedance at parallel resonant frequency whereby the signal is greatly attenuated and the detected output is a minimum, an isolation transformer connected between the input signal source and the crystal for adjusting the impedance and level of the signal source feeding the crystal, a first diode and RC filter connected to said crystal for converting the signal to a D.C. voltage, a second diode and RC filter connected to the input signal source bypassing the isolation transformer to provide a D.C. voltage proportional to the level of the input signal which is added algebraically to the rectified voltage from said first diode so that the resultant output, instead of being all positive will be positive at the series resonant frequency and negative at the parallel resonant frequency, a potentiometer connected between the RC filters for determining the amount of signal passed through the second diode that is to be added to the signal passing through said crystal, an RF choke shunting said crystal and providing a D.C. return for the rectified current of said crystal and output means connected to said potentiometer.

5. In a narrow bandwidth frequency discriminator circuit comprising an RF input signal source, first means for frequency monitoring the RF signal and for converting the RF signal to a D.C. voltage proportional to the RF amplitude, an isolating transformer for coupling said first means to said RF input signal source, second means connected to said RF input signal source and bypassing said isolation transformer for providing another signal whose D.C. voltage is proportional to the level of the input signal, means for adding algebraically the D.C. bypass voltage of said second means to the frequency monitored D.C. voltage of said first means whereby said D.C. bypass voltage provides a self-adjustable balancing voltage for said circuit, output means connected to said adding means wherein the first means comprises a quartz crystal and a diode connected in series and an RC filter shunting said diode, said second means comprises a diode connected reversely of said other diode and an RC filter in shunt wherein an RF choke is connected between said quartz crystal and said diodes.

References Cited by the Examiner

UNITED STATES PATENTS

| | | | |
|---|---|---|---|
| 2,712,600 | 7/55 | Beckwith | 329—117 |
| 2,834,879 | 5/58 | Bauman | 329—146 X |
| 2,849,607 | 8/58 | Leister | 329—117 |
| 2,889,458 | 6/59 | Baum | 329—117 X |
| 3,041,451 | 6/62 | Laing et al. | 329—117 X |
| 3,122,707 | 2/64 | Godbey | 329—117 |

FOREIGN PATENTS

| | | |
|---|---|---|
| 450,319 | 8/48 | Canada. |

ROY LAKE, *Primary Examiner.*

L. MILLER ANDRUS, ARTHUR GAUSS, ALFRED L. BRODY, *Examiners.*